G. O. HOWETH.
TRANSMISSION GEAR FOR AUTOMOBILES.
APPLICATION FILED OCT. 3, 1921.
1,423,426.
Patented July 18, 1922.
3 SHEETS—SHEET 1.
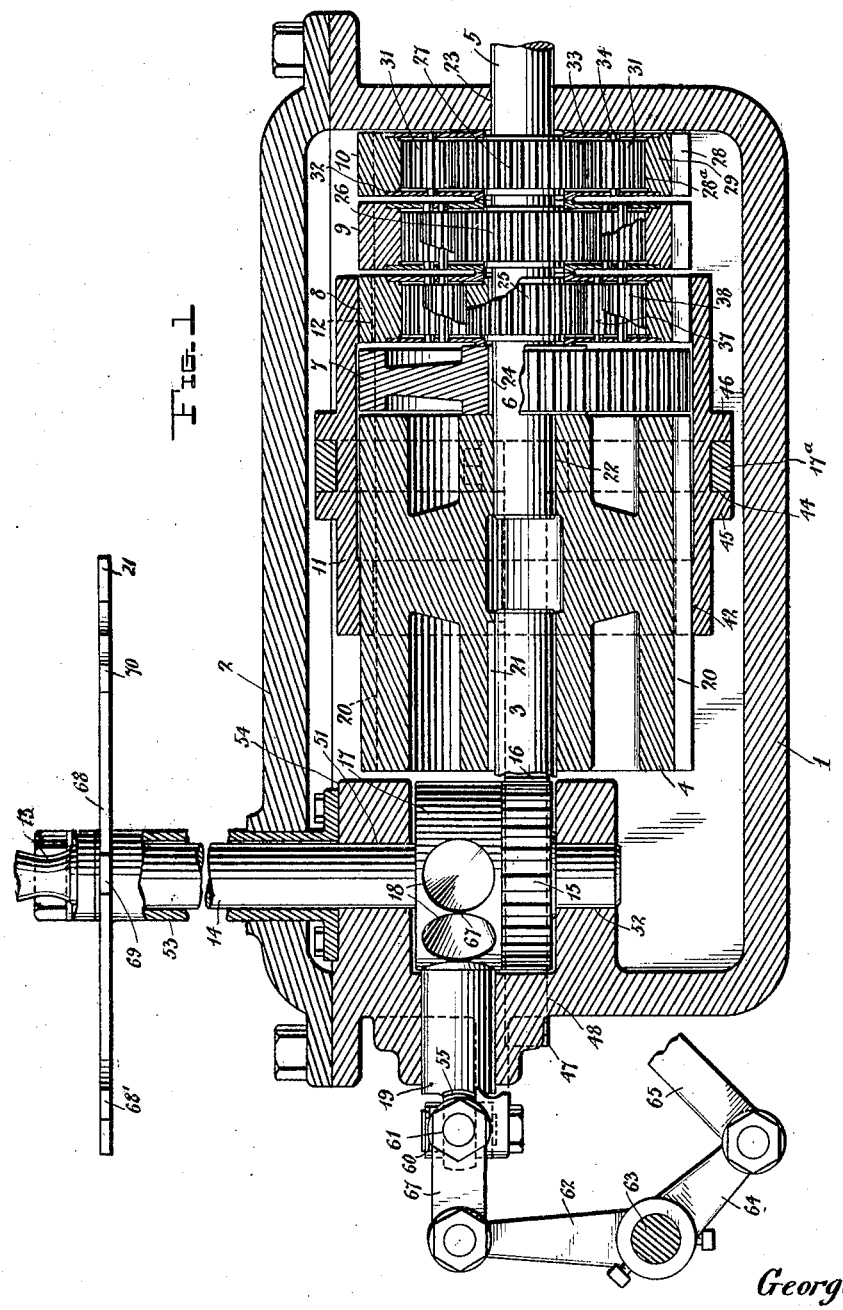
Inventor
George O. Howeth,
Attorney

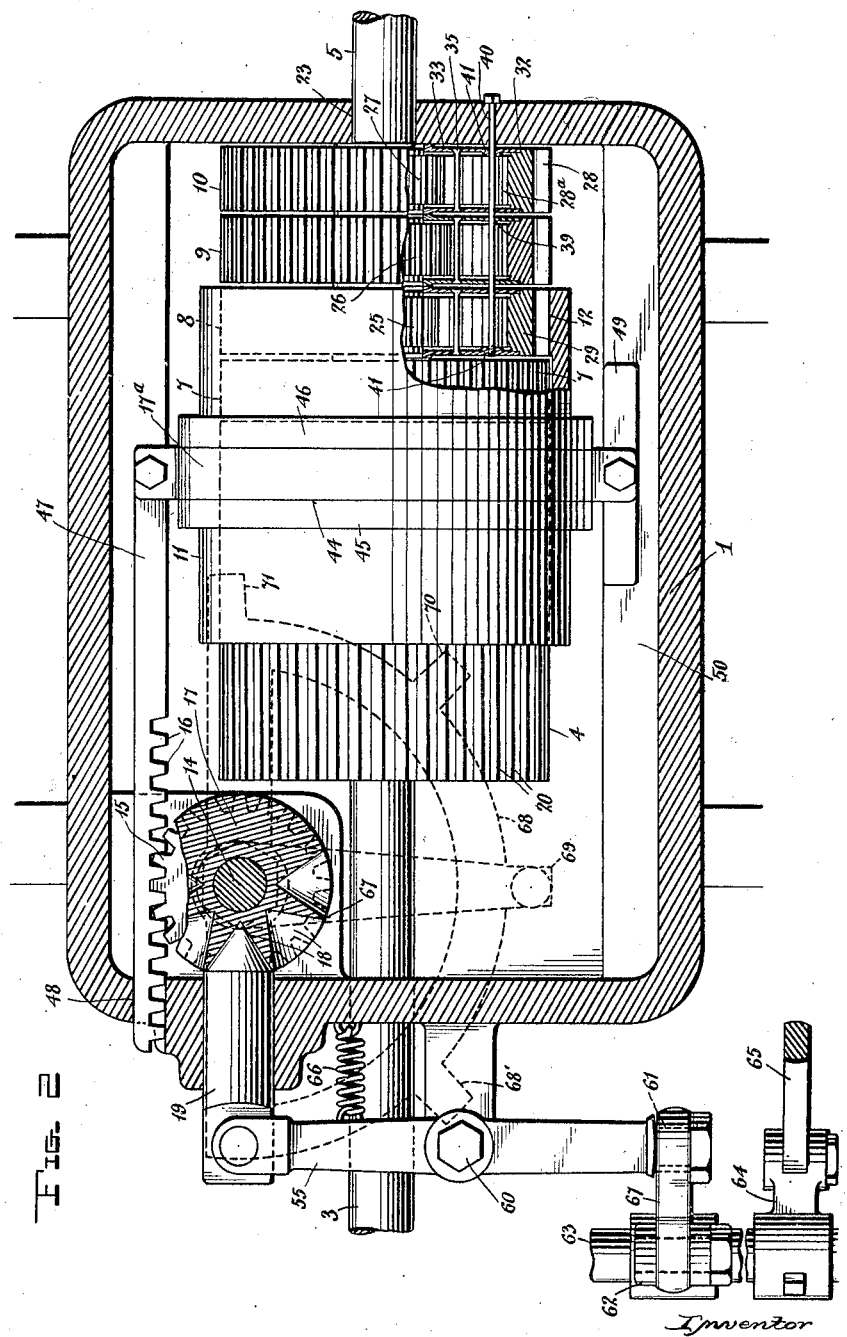

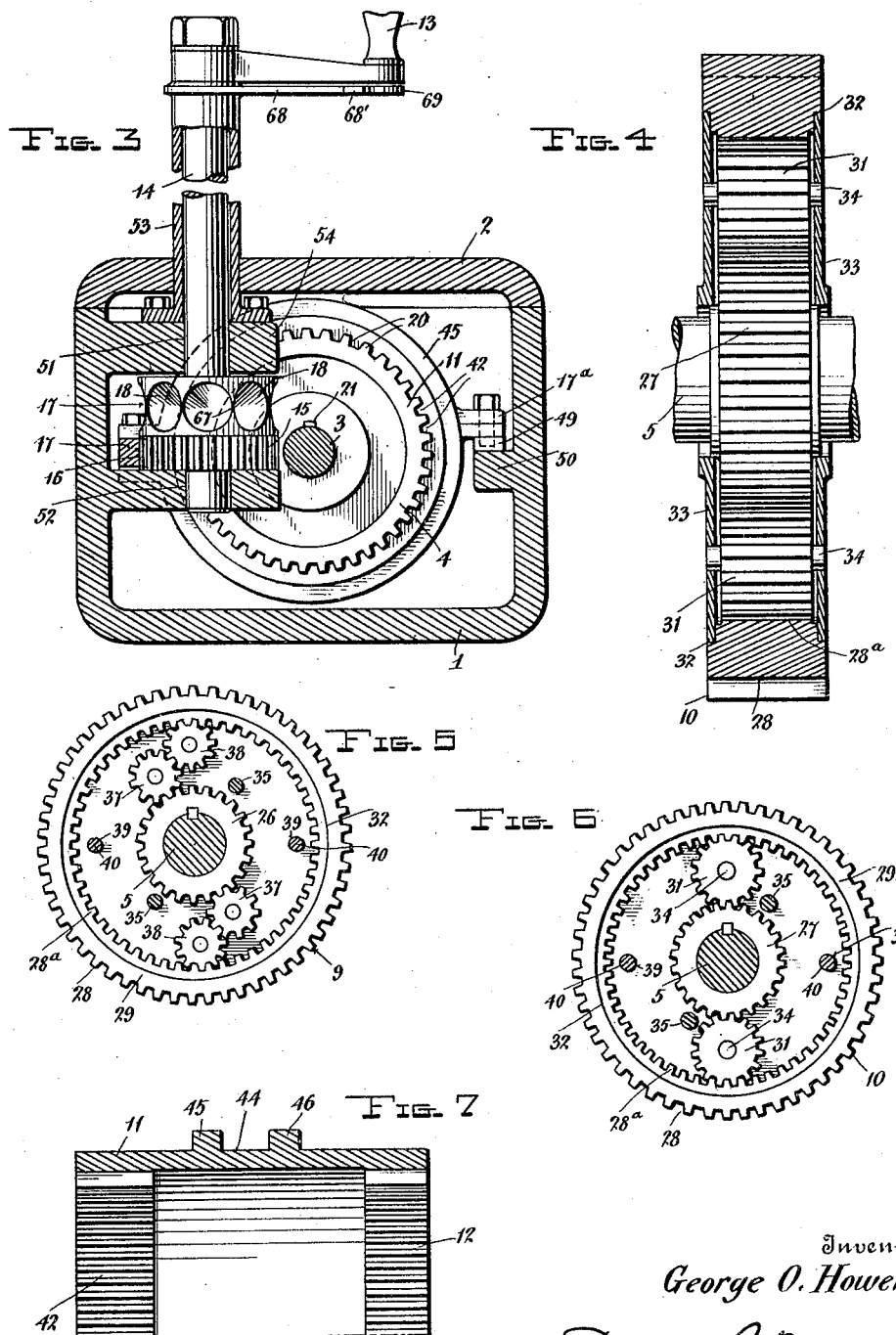

UNITED STATES PATENT OFFICE.

GEORGE O. HOWETH, OF MORATTICO, VIRGINIA.

TRANSMISSION GEAR FOR AUTOMOBILES.

1,423,426.   Specification of Letters Patent.   Patented July 18, 1922.

Application filed October 3, 1921. Serial No. 504,984.

*To all whom it may concern:*

Be it known that I, GEORGE O. HOWETH, a citizen of the United States, residing at Morattico, in the county of Lancaster and State of Virginia, have invented new and useful Improvements in Transmission Gears for Automobiles, of which the following is a specification.

This invention relates to transmission gear for automobiles and has for one of its objects the construction of a change speed gear mechanism in which a simpler arrangement of gear shift is provided than that now generally in use.

Another object of the invention is to provide a system of selective gearing in which all speed ratios except direct drive are obtained by transmitting the torque of the drive shaft to the driven shaft through sets of constantly meshing gearing.

Another object of the invention is to provide aligned driving and driven shafts in a gear box, the drive shaft being constructed with a spline-drum keyed thereto and the driven shaft having a direct drive gear and a plurality of gearing units corresponding in number to the several speed changes including reverse, in operative relation thereto, and a clutch sleeve in slidable engagement with said spline-drum, said sleeve being advanceable to selectively engage any one of the said units or the direct drive gear and retractable so as to be wholly withdrawn from said driven shaft gearing on to said drum when in neutral position.

Another object of the invention is to provide constantly meshing gear units for said gearing which are removable as a whole and replaceable as a whole, as an article of manufacture.

Still another object of the invention is to provide a gear box having a drive and driven shaft each shaft being journalled on one side in a wall of said gear box, the drive shaft being provided with a spline-drum for operating the speed change gearing of said driven shaft, the inner end of said driven shaft being held in a bearing in the inner end of said drum, said driving and driven shafts thus mutually maintaining each other in alignment through the agency of said bearing.

Another object of the invention is to provide locking means so connected with the clutch operating mechanism that the gears cannot be shifted while the clutch is thrown in.

A still further object of the invention is to so construct the locking means that the clutch cannot be thrown in unless there has been a positive selection of gears so that the power will not be applied to the driven shaft while the clutch sleeve is bridging two gears.

Another object of the invention is to provide a natural sequence in the order of gear shift, that is, from reverse to low to intermediate to direct in one direction with a neutral position next to the direct drive.

With the above and other objects in view, my invention consists in the improved transmission gear for automobiles illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:—

Figure 1 is a side elevation of a gear box showing my improved transmission gear partly in section.

Figure 2 is a plan view of the structure shown in Figure 1.

Figure 3 is a sectional view through the gear box showing the locking drum and other details.

Figure 4 is a cross sectional view through one of the gear units shown in Figure 1.

Figure 5 is an elevation of the low gear unit with the cover removed.

Figure 6 is a similar view of the reverse gear unit.

Figure 7 is a cross section through a portion of the clutch sleeve.

In the drawings, the numeral 1 represents the gear box of an automobile transmission having the removable cover 2. Extending within the gear box as best shown in Figure 2 is the drive shaft 3 which is connected at its forward end to the driven element of the clutch not shown and carries keyed to its inner end the spline-drum 4. Extending through the opposite end of the gear box is the driven shaft 5 one end of which leads to the rear axle (not shown) and the inner end 6, of which carries in operative relation thereto the direct drive gear 7 and the constantly meshing gear units 8, 9 and 10 respectively which comprise the speed reduction gearing and the reverse gear. Splinably mounted upon the spline-drum 4 is a sleeve 11 which is slidable in either direction along said drum but never out of engagement therewith, one end of said sleeve having an annular crown 12 of internal gear teeth capable of being meshed with external teeth upon the direct drive gear or upon one of said gear units.

The gear shift handle 13 actuates the shaft 14 which rotates the spur gear 15 the latter being in mesh with the teeth 16 of the rack bar 47 which is connected to the yoke 17 by which the sleeve 11 is shifted.

Rotatable with the shaft 14 is the locking drum 17 having the conical depressions 18 engageable with the bolt 19 which is operable in synchronism with the clutch operating mechanism as will hereinafter be more specifically described.

Referring more in detail to the construction shown in the drawings the drive shaft 3 is provided on its inner end with a drum 4 which is constructed on its outer surface with a number of parallel spline grooves 20 extending the full length thereof. Said drum 4 is secured to the shaft 3 by the key 21 and is provided axially thereof with a bearing 22 which receives the inner end of the driven shaft 6. The driven shaft is thus journalled at one side in the wall of the gear box at 23 and at the other side in the bearing 22 carried by the drum 4. By this construction the drive and driven shafts are maintained in axial alignment.

Secured to the driven shaft 3 is the direct drive gear 7 which is externally toothed and is of the same diameter as the spline drum 4. Said direct drive gear is keyed to the driven shaft 6 as at 24. Fixedly secured to the driven shaft 6 are the smaller gears 25, 26 and 27 the last of which may be of the same size as the gear 26 although this is not essential since the gear 27 acts as the reverse gear. The gear 25 is smaller than the gear 26 since it is to act as the intermediate gear. Each of the three gears form the central element of said constantly meshing gears, including an internal ring gear.

As shown in Figures 2, 4 and 6 the gear unit 10 of which the gear 27 is the central element comprises an outer ring gear 29 having an external diameter equal to the diameter of the direct drive gear and externally and internally toothed at 28 and 28a respectively, the external teeth 29 being of the same pitch and number as the teeth of the direct drive gear 7. Between the central gear 27 and the ring gear 29 are the pinions 31 diametrically spaced on opposite sides of the gear 27. As will be noted from Figure 6, a clockwise movement of the ring gear 29 results in a counter-clockwise movement of the central gear 27. As the shafts of all engines rotate in a clockwise direction and the ring gear 29 is rotated directly by the engine shaft the construction shown in Figure 6 will constitute the reverse gear of the automobile. On either side as clearly shown in Figure 4 the ring gear 29 is inwardly rabbeted as at 32 for the reception of plates 33. Said plates form journals 34 for the shafts of the pinions 31 and are riveted together permanently as shown at 35 in Figure 2.

The gear units 8 and 9 are similar in construction to the gear unit 10 which is shown in Figure 6 except that an additional gear 37 is provided between the gear 38 and the central gear 26 in order to rectify the direction of the rotation of the latter so that the central gear 26 will rotate in the same direction as the shaft of the engine. The gear unit 8 differs from gear unit 9 only in the fact that the central gear 25 is smaller than the central gear 26 since the said unit 8 acts as the intermediate gear ratio of the transmission mechanism. It will be noted that all three of the central gears 25, 26 and 27 of the gear units are keyed to the driven shaft 5 in the same manner as the direct drive gear 7. The plates 33 which face both sides of each of the said gear units are provided with aligned apertures 39 on opposite sides thereof through which pass the bolts 40 which are secured to the end wall of the gear box.

In order that the face of the plate 33 which lies adjacent the direct drive gear 7 shall be free from projections, said plate is cast with inwardly extending bosses 41 which are internally threaded to receive the inner ends of the bolts 40.

By this construction the plates 33 remain stationary, their peripheries serving as tracks upon which the ring gears of the said units revolve. By removing the bolts 40 and the driving out the key 80 which secures the central gear of each unit to the shaft anyone of the gear units may be removed as a whole when broken or worn out and replaced with another unit which may be made and sold as an article of manufacture.

The sleeve 11 which connects the drum 4 selectively to the respective driven gears is provided at either end with an annular row of gear teeth 42 and 12 respectively, the gear teeth 42 being always in mesh with the spline grooves 20 on the drum 4 while the gear teeth 12 are slidable selectively into engagement with the direct drive gear 7 or any one of the three constantly meshing gear units. The row of gear teeth 12 is made of just sufficient width to completely engage the width of the external gear teeth on the respective gears and not so long as to bridge over the teeth of two gears when properly in mesh.

The sleeve 11 is provided externally with the groove 44 formed between the annular flanges 45 and 46. Within said groove is rotatably mounted the yoke 17 which as shown in Figure 2 is connected on one side to a rack bar 47 which runs longitudinally of the gear box and extends through a slot 48 in one end thereof, said slot serving as a bearing for said rack bar. The other side of the yoke member 17 is provided with a guide element 49 which slides along the guideway 50 which is integral with the side of the gear box. By means of the rack bar 47 the sleeve 11 is operated. Said sleeve and drum are approximately the same width so that when in neutral position the sleeve is withdrawn entirely from the four sets of driven gear and rests entirely upon the surface of said drum.

Journalled in vertical bearings 51 and 52 in the gear box is the operating shaft 14 the upper part of which is carried in the housing 53 which extends through the cover 2 of the gear box and is bolted to the lug 54 within said gear box which provides the bearing 51 for said shaft. On the lower part of said shaft is mounted the spur gear 15 which meshes with the teeth 16 on the rack bar 47. When the shaft 14 is turned it rotates the gear 15 and reciprocates the rack bar which operates the sleeve 11. Keyed to the shaft 14 above the spur gear 15 is the locking drum 17, this is provided with five conical depressions 18 corresponding in number to the number of changes possible with the gear shift. The peripheral edges of said conical depressions 18 merge with one another on the surface of the drum 17 to form knife edges. Engageable with the depressions 18 is the locking bolt 19 the end of which is shaped to center itself within the conical depressions 18. The locking bolt 19 is pivotally connected to a lever 55 which is fulcrumed at 60 to a part of the gear box and is universally connected at 61 to a link 67 connecting with a bell crank lever 62 which rises from the clutch operating shaft 63 and is fixedly secured thereto. Another bell crank 64 is secured to the clutch operating shaft substantially at right angles to the bell crank 62 to which is pivotally secured the shank 65 of the clutch pedal, the latter being broken away and not shown. When the clutch pedal is depressed the rotation of the clutch operating shaft 63 which disengages the clutch of the automobile also draws the bolt 19 out of engagement with the conical depressions in the locking drum 19. The powerful spring, not shown, which holds the clutch in engagement returns the bolt 19 to its position of engagement within the conical recesses 18 of the locking drum 17. In the event of there being lost motion due to wear of the parts, in the linkage between the clutch and the bolt 19, I have provided the supplementary spring 66 which is of sufficient strength to positively return the bolt 19 to its position of engagement with the locking drum when the pressure of the foot is removed from the clutch pedal.

The conical depressions 18 are made to come together in a knife edge as shown at 66 in Figure 3 in order that should the gears be changed carelessly so that the teeth 43 on the sleeve 11 are in a position bridging the teeth on two of the driven gears the conical end of the bolt 19 will be partly in one or the other of two adjacent depressions 18 and the pressure of the spring 66 or the clutch spring of the automobile will force the bolt 19 to center itself in that depression in which it has partially entered, thus causing the automatic partial rotation of the gear 15 and the correct setting of the teeth 43 of the sleeve 11 with one of the driven gears before the clutch of the automobile comes into position of engagement.

On the upper end of the housing 53 is mounted the gear shift plate 68 which has the several positions of gear shift indicated thereon by projections 68', 69, 70 and 71 respectively. When the handle 13 is to the extreme left, as shown in Figure 2, the sleeve 11 will be in mesh with the reverse gear. When the handle is opposite the projections 68 the sleeve 11 will be in engagement with the low gear. When the handle is adjacent the projection 69 the sleeve 11 and the intermediate gear unit will be in operative engagement. When the handle is opposite the projection 70 the gears will be in direct drive and when it is over the lug 71 the sleeve 11 will be entirely withdrawn from the driven gears and the transmission will be in neutral.

The operation of the device is as follows: The handle 13 is placed in superposed position to the projection 71. The sleeve is then out of mesh with the driven gears and coincident with the spline drum 4. The engine is cranked in the usual manner, and the clutch being in engagement, the drum 4 will be in rotation carrying with it the sleeve 11. If the operator desires to start the car forward in low gear he first throws out the clutch and awaits until the drum 4 comes to rest. He then moves the operating handle 13 around opposite the lug 68. This throws the sleeve 11 in engagement with the low gear unit 9. The clutch is then let in and the driven shaft rotates in low gear. It is impossible to further change the gears without letting out the clutch because the bolt 19 is seated in one of the depressions 18 locking the operating lever 13 against movement. When the operator desires to change to intermediate gear he throws out the clutch and shoves the operating lever to the next projection 69. This will slide the gear teeth 43 of the sleeve 11 off of the low gear unit and on to the next unit which is the intermediate gear. On account of the small distance apart of said units, the time interval occupied by the change from one gear to the other is so short that there will be no clashing of gears. Although not shown, it is common practice and desirable to have the ends of the teeth of the several gears and of the sleeve 11 tapered or chamfered so as to facilitate ready and easy engagement when going from one gear ratio to another.

When the operator desires to shift to direct drive he merely throws out the clutch and moves the operating lever down to the projection 70; this moves the teeth 43 of the sleeve 11 into mesh with the direct drive gear 7. Should the operator wish to reverse the car he throws out the clutch and moves the lever in one continuous motion around to the extreme left in which position the sleeve 11 is in mesh with the reverse gear. In changing from high to a lower gear the reverse order of position is followed.

Should, as is most often the case, the operator desire to back out of a garage before starting in a forward direction he merely moves his operating levers from the extreme left position successively through the positions indicated by the projections 68 to 71 throwing out the clutch at each change of gear. If he should be careless and throw the operating lever 13 to a position between any two of the projections, he will then find on letting in the clutch that the gears will automatically shift themselves into the gear ratio which is nearest the operating lever, due to the fact that the depressed end of the bolt 9 must find a seat for itself in one or the other of two adjacent depressions 18. Thus there will be no danger of stripping the gears by the engagement of the teeth 43 with two of the driven gear units at the same time.

It is obvious that various changes may be made in the details of construction without departing from this invention and it is therefore to be understood that this invention is not to be limited to the specific construction shown and described.

Having described my invention what I claim as new and desire to secure by Letters Patent, is:—

1. In transmission gear mechanism for auto-vehicles, a drive shaft, a drum fixed to said drive shaft and having external spline grooves running longitudinally thereof, a driven shaft, a plurality of speed change gear units on said driven shaft, said gear units being externally toothed of uniform diameter and a sleeve provided with internal gear teeth at each end, means for shifting said sleeve so that while the internal teeth at one end permanently engage the grooves of said spline drum the internal teeth on the other end of said sleeve progressively engage external teeth of one of the speed change gear units.

2. In transmission gear mechanism for auto-vehicles, a drive shaft, a spline drum fixed to said drive shaft, a driven shaft, a plurality of speed change gears fixed to said driven shaft, including a direct drive gear and a plurality of smaller gears each forming the central element of a constantly meshing gear reduction unit, a ring gear surrounding each of said smaller gears, intermediate gears operatively connecting each ring gear with its respective central gear and a sleeve permanently engaging said drum at one end and progressively engageable at its other end with either said direct drive gear or one of said ring gears.

3. In transmission gear mechanism for auto-vehicles, a gear box, a drive shaft passing through said gear box, a plurality of speed reduction units bolted in fixed relation to said gear box, each unit comprising a pair of stationary spaced plates, a ring gear mounted between said plates and rotatable about the peripheral edges of said plates, a central gear keyed to said drive shaft, and intermediate gears journalled in said plates and in mesh with said ring gear and central gear.

4. In transmission gear mechanism for auto-vehicles, a gear box, a driven shaft journalled in said gear box, a plurality of gear reduction units fixedly secured to said gear box, each unit comprising a pair of stationary spaced plates, pinions journalled between said plates, a ring gear rotatable between said plates about the peripheral edges thereof, said ring gear being in mesh with said planetary pinions, a central gear in mesh with said pinions and fixed to said driven shaft, a drive shaft and means permanently connected with said drive shaft and progressively engageable with one of said speed reduction units.

5. A gear reduction unit comprising a pair of plates permanently secured in spaced relation to each other, a central gear mounted axially between said plates, a ring gear rotatable between said plates about the peripheral edges thereof and intermediate gears journalled in said plates and in mesh with said ring gear and central gear.

6. A gear reduction unit comprising a pair of plates secured in spaced relation to each other, a central gear mounted axially between said plates, a ring gear rotatable about the peripheral edges of said plates and being rabbeted on opposite sides to form a seat for said plates and intermediate pinions journalled in said plates engaging said ring gear and central gear.

7. In a gear reduction unit, a pair of plates permanently secured in spaced relation to each other, a central gear mounted axially between said plates, a ring gear rotatable about the peripheral edges of said plates and rabbeted to form a track for the edges of said plates, said ring gear being externally toothed and an intermediate pinion journalled in said plates and engaging both said ring gear and central gear.

8. In transmission gear mechanism for auto-vehicles, a gear box, a driven shaft journalled in said gear box, a plurality of gear reduction units for said driven shaft, each comprising a pair of plates permanently secured in spaced relation to each other, a ring gear rotatable between the plates of each pair about the peripheral edges thereof, a central gear for each unit fixed to said driven shaft, an intermediate gear meshing with both said ring gear and central gear in each unit, a series of aligned apertures passing through the plates of all said units and a bolt passing through said apertures and securing the plates of said units fixedly to said gear box.

9. In transmission gear mechanism for auto-vehicles, a gear box, a driven shaft journalled in said gear box, a plurality of gear reduction units for said driven shaft, each comprising a pair of plates permanently secured in spaced relation to each other, a ring gear rotatable between the plates of each pair about the peripheral edges thereof, a central gear for each unit fixed to said driven shaft, an intermediate gear journalled in said plates meshing with both said ring gear and central gear in each unit, a series of aligned apertures passing through the plates of all said units and a bolt passing through said apertures and securing the plates of said units fixedly to said gear box, a drive shaft journalled in said gear box, a spline drum fixed to said drive shaft and means permanently engaging said drum and progressively engaging one of said speed reduction units.

10. In transmission gear mechanism for auto-vehicles, a gear box, a drive shaft journalled in said gear box, a direct drive gear fixed to said driven shaft, a plurality of speed reduction units operatively connected to said driven shaft, each unit comprising a pair of plates permanently secured in spaced relation to each other, a central gear between each pair of plates fixedly secured to said driven shaft, a ring gear mounted to rotate about the peripheral edges of each pair of plates, intermediate pinions journalled in said plates in mesh with both said ring gear and central gear, said direct drive gear and each of said speed reduction units being provided externally with gear teeth, a drive shaft journalled in said gear box, a spline drum mounted on said drive shaft, a sleeve permanently engaging said spline drum and progressively engageable with said direct drive gear or a ring gear of any one of said speed reduction units.

11. In transmission gear mechanism for auto-vehicles, a driven shaft, a direct drive gear keyed to said shaft, a plurality of speed reduction units operatively connected to said shaft, one of said units being a reverse gear unit, other of said units being forward speed reduction units, each of said units comprising a pair of plates permanently secured in spaced relation to each other, a central gear fixed to said driven shaft, a ring gear rotatable about the peripheral edges of said plates, an intermediate pinion in said reverse gear unit meshing with both said ring gear and central gear, a pair of intermediate gears in said forward gear reduction units meshing with each other, one of said intermediate gears meshing with said ring gear and the other with said central gear, a drive shaft journalled in said gear box, a spline drum on said drive shaft and a sleeve permanently engaging said spline drum and engageable with said direct drive gear or with one of said speed reduction units.

12. In transmission gear mechanism for auto-vehicles, a gear box, a driven shaft journalled in said gear box, a direct drive gear keyed to said driven shaft, a plurality of gear reduction units operatively connected to said driven shaft, one of said units being a reverse gear unit and the others forward gear reduction units each of said units comprising a pair of plates permanently secured in spaced relation to each other, a central gear between each pair of plates secured to said driven shaft, a ring gear rotatable about the peripheral edges of each pair of plates, an intermediate pinion in said reverse gear unit journalled in said plates in mesh with said ring gear and said central gear, a pair of intermediate pinions in each of the other gear reduction units journalled in said plates, in mesh with each other, one of said pinions meshing with said ring gear and the other of said central gear, the plates of all units being fixedly secured to the gear box, and the direct drive gear and each of said ring gears being externally toothed, a drive shaft journalled in said gear box, a spline drum on said drive shaft and a sleeve permanently engaging said spline drum and progressively engageable with the external teeth on said drive gear or on any one of said speed reduction units.

13. In transmission gear mechanism for auto-vehicles, a gear box, a driven shaft journalled at one side in a wall of said gear box, a drive shaft journalled at one side in the opposite wall of said gear box and in alignment with said driven shaft, a spline drum secured to the inner end of said drive shaft and having a bearing on the side adjacent said driven shaft, said driven shaft being journalled at its inner end in said bearing, a direct drive gear fixed to said driven shaft, a plurality of gear reduction units operatively connected to said driven shaft, each of said units comprising a pair of plates permanently secured in spaced relation to each other, one of said units being a reverse gear unit and the others being forward gear reduction units, a central gear between each pair of plates secured to said driven shaft, a ring gear rotatable about the peripheral edges of each pair of plates, said ring gear being toothed internally and externally, an intermediate pinion in said reverse gear unit journalled in said plates and in mesh with said ring gear and central gear, a pair of intermediate pinions in each of said forward gear reduction units journalled in said plates in mesh with each other, one of said pinions being in mesh with a central gear and the other with a ring gear, means for permanently securing the plates of all said speed reduction units fixedly to a wall of said gear box, and a sleeve permanently engaging said spline drum and progressively engageable with said direct drive gear or one of said speed reduction units.

14. In a transmission gear mechanism for auto-vehicles, a drive shaft, a driven shaft, a series of change speed gear units on said driven shaft, a coupling permanently engaging said drive shaft and progressively engageable with the gears on said driven shaft, means for shifting said coupling into progressive engagement with a gear on said driven shaft, comprising a manually operable shaft in operative engagement with said coupling a lock drum on said shaft having depressions corresponding in number and position to the several positions of gear shift, a bolt engageable with said depressions, said bolt being connected with the clutch operating means of the auto vehicle to normally engage one of said depressions when the clutch means is in clutch engaging position and to be released therefrom when the clutch is thrown out.

15. In a transmission gear mechanism for auto-vehicles, a drive shaft, a driven shaft, a transmission gear on said driven shaft, a coupling permanently engaging said drive shaft and engageable with the gear on said driven shaft, means for shifting said coupling into engagement with said gear comprising a manually operable shaft, a gear on said shaft in operative engagement with said coupling, a lock drum on said shaft coaxial with said gear having a depression corresponding to the position of said coupling when in engagement with said gear, a bolt radially movable for engagement with said depression, said bolt being connected with the clutch operating means of the auto-vehicle to normally engage said depression when said clutch means is in clutch engaging position and to be released therefrom when the clutch is thrown out.

16. In a transmission gear mechanism for auto-vehicles, a drive shaft, a driven shaft, a plurality of transmission gears on said driven shaft, a coupling permanently engaging said drive shaft and progressively engageable with the gears on said driven shaft, means for shifting said coupling into engagement with a gear on said driven shaft, comprising a manually operable shaft in operative engagement with said coupling, a lock drum on said shaft having conical depressions corresponding in number and position to the several positions of gear shift, a bolt having a tapered end engageable with said depressions, said bolt being connected with the clutch operating means of the auto-vehicle to normally engage the depressions when the clutch operating means is in clutch engaging position and be released therefrom when the clutch is thrown out.

17. In a transmission gear mechanism for auto-vehicles, a drive shaft, a driven shaft, a plurality of transmission gears on said driven shaft, a coupling permanently engaging said drive shaft and progressively engageable with the gears on said driven shaft, means for shifting said coupling into engagement with a gear on said driven shaft, a lock drum on said shaft provided with conical depressions corresponding in number and position to the several positions of gear shift, the walls of adjacent depressions merging into knife edges on the surface of said lock drum, a bolt having a tapered end slidably mounted for engagement with said depressions, said bolt being connected with the clutch operating means on the auto-vehicle to normally engage one of said depressions when the clutch operating means is in clutch engaging position and to be released therefrom when the clutch is thrown out, said knife edges determining the positive entry of said bolt into one of two adjacent depressions when said gears are not completely shifted, and means for forcibly centering said bolt in said depression to cause said bolt to co-act with the walls of said depression to turn said drum and operating shaft sufficiently to complete the shifting of the gears.

18. In transmission mechanism for auto-vehicles, a driven shaft having speed change gears thereon arranged in natural order of selection, that is, in reverse, low, intermediate and direct drive, a drive shaft, coupling means permanently engaging said drive shaft and comprising a single clutch member progressively engageable with said speed change gears and having a position of release therefrom, operating means for said coupling comprising a quadrant having the several positions of gear shift indicated thereon in the natural order of selection and a neutral point corresponding to the position of release of said coupling, and an operating lever movable continually in one direction, to the several positions of gear shift indicated on said quadrant to shift said coupling selectively from one to another of the several change speed gears in the order of their natural selection, and to the position of release.

In testimony whereof I have hereunto set my hand in presence of two subscribing witnesses.

GEORGE O. HOWETH.

Witnesses:
O. L. HAMMELL,
T. G. HALE.